(12) United States Patent
Gaskey et al.

(10) Patent No.: US 12,553,827 B2
(45) Date of Patent: Feb. 17, 2026

(54) METHOD AND APPARATUS FOR DETERMINING CRYSTALLOGRAPHIC ORIENTATION ON CRYSTALLINE SURFACES

(71) Applicant: NANYANG TECHNOLOGICAL UNIVERSITY, Singapore (SG)

(72) Inventors: Bernard Daniel Gaskey, Singapore (SG); Ludwig Hendl, Singapore (SG); Matteo Seita, Singapore (SG)

(73) Assignee: Nanyang Technological University, Singapore (SG)

( * ) Notice: Subject to any disclaimer, the term of this patent is extended or adjusted under 35 U.S.C. 154(b) by 476 days.

(21) Appl. No.: 17/771,386

(22) PCT Filed: Oct. 23, 2020

(86) PCT No.: PCT/SG2020/050611
§ 371 (c)(1),
(2) Date: Apr. 22, 2022

(87) PCT Pub. No.: WO2021/080515
PCT Pub. Date: Apr. 29, 2021

(65) Prior Publication Data
US 2022/0373460 A1    Nov. 24, 2022

(30) Foreign Application Priority Data

Oct. 24, 2019   (SG) ............................ 10201909958R

(51) Int. Cl.
*G01N 21/47*      (2006.01)
*G01N 21/55*      (2014.01)
(Continued)

(52) U.S. Cl.
CPC ...... *G01N 21/4788* (2013.01); *G01N 21/8806* (2013.01); *G01N 21/8851* (2013.01); *G01N 21/55* (2013.01); *G01N 2021/8477* (2013.01)

(58) Field of Classification Search
CPC ........... G01N 21/4788; G01N 21/8806; G01N 21/8851; G01N 2021/8477; G01N 21/55
(Continued)

(56) References Cited

U.S. PATENT DOCUMENTS 6,766,056 B1 *  7/2004  Huang ................... G06V 10/44
                                                            382/209
7,034,531 B1 *  4/2006  Tuch ................. G01R 33/56341
                                                            324/309
(Continued)

FOREIGN PATENT DOCUMENTS

JP      2007101394 A  *  4/2007

OTHER PUBLICATIONS

Seita, Acquisition of partial grain orientation information using optical microscopy, Oct. 2016, Elsevier, pp. 70-81 (Year: 2016).*

(Continued)

*Primary Examiner* — Tarifur R Chowdhury
*Assistant Examiner* — Kaitlyn E Kidwell
(74) *Attorney, Agent, or Firm* — Seed IP Law Group LLP

(57) ABSTRACT

A method of determining 3D crystallographic orientation on a crystalline surface of a sample. The method includes directing a beam of collimated light at a predetermined angle of incidence, wherein reflections from the crystalline surface are projected onto an image sensing unit positioned in a path of reflected light; obtaining a directional reflectance profile from an image of the reflectance pattern generated by the image sensing unit by pixelising the reflectance pattern into a pixelated-image with a center coinciding an intersection of a specularly reflected light beam and the image sensing unit;

(Continued)

and processing the directional reflectance profile based on analyzing reflection intensity data in the pixelated-image of the directional reflectance profile to determine the crystallographic orientation of the crystalline surface. A further method including projecting the reflections onto a detector screen and capturing an image of the reflectance pattern on the detector screen.

20 Claims, 5 Drawing Sheets

(51) Int. Cl.
  *G01N 21/84* (2006.01)
  *G01N 21/88* (2006.01)
(58) Field of Classification Search
  USPC .......................................................... 356/445
  See application file for complete search history.

(56) References Cited

U.S. PATENT DOCUMENTS

| | | | |
|---|---|---|---|
| 2003/0043375 A1* | 3/2003 | Opsal | G01J 4/04 356/369 |
| 2004/0184032 A1 | 9/2004 | Mahon et al. | |
| 2006/0103844 A1* | 5/2006 | Opsal | G01N 21/211 356/369 |
| 2010/0135560 A1* | 6/2010 | Embleton | G06T 7/12 382/128 |
| 2015/0070474 A1* | 3/2015 | Bhat | G02B 27/0075 348/49 |
| 2015/0134269 A1* | 5/2015 | Norris | G01J 3/504 702/28 |
| 2015/0363927 A1* | 12/2015 | Imai | G01N 21/4738 348/128 |
| 2017/0039696 A1* | 2/2017 | Fu | H01L 22/12 |

OTHER PUBLICATIONS

Extended European Search Report, dated Nov. 6, 2023, for EP Application No. 20879773.8. (10 pages).

Gaskey et al., "Optical characterization of grain orientation in crystalline materials," *Acta Materialia 194*:558-564, May 20, 2020.

Engler et al., "Single Grain Orientation Measurements Applied to the Formation and Growth of Recrystallization Nuclei," *Textures and Microstructures 26-27*:337-359, 1996.

Seita et al., "Acquisition of partial grain orientation information using optical microscopy," *Acta Materialia 123*:70-81, 2017.

* cited by examiner

METHOD AND APPARATUS FOR DETERMINING CRYSTALLOGRAPHIC ORIENTATION ON CRYSTALLINE SURFACES

CROSS-REFERENCE TO RELATED APPLICATIONS

The present application claims the benefit of the Singapore patent application No. 10201909958R filed on 24 Oct. 2019, the entire contents of which are incorporated herein by reference for all purposes.

TECHNICAL FIELD

Various embodiments generally relate to a method of determining crystallographic orientation on a crystalline surface and an apparatus configured to perform the method of determining crystallographic orientation on the crystalline surface. In particular, various embodiments generally relate to an optical method of determining crystallographic orientation on a crystalline surface and an optical instrument apparatus configured to perform the method of determining crystallographic orientation on the crystalline surface.

BACKGROUND

Crystalline materials including ceramics and metals are ubiquitous building blocks of modern society. They derive many critical properties from details of the underlying microstructure, including the size, shape, and orientation (the direction of the planes of atoms) of the constituent crystallites. Several techniques exist for measuring such information using diffraction. X-ray diffraction can be performed at the laboratory scale or using specialized equipment associated with synchrotron light sources. For very small sample volumes, transmission electron microscopes can be employed to determine local crystal structure and orientation via electron diffraction. However, measuring local orientation information by X-ray diffraction is difficult due to the large penetration depth of X-rays in many materials. Electron backscatter diffraction (EBSD) is another method for characterizing important crystallographic features on the material surface, wherein an electron beam diffracting from a point on the sample surface creates a characteristic pattern associated with the local crystal structure and orientation. However, electron diffraction requires conductive samples that can be exposed to high vacuum conditions while the measurement is taken. Further, both methods require costly specialized equipment and are severely limited in sample size and throughput.

Optical microscopy has significant advantages over the techniques described above in regard to sample preparation and measurement throughput. Previously, many optical techniques have been applied to determine some microstructural details, including size and shape of crystallites as well as partial orientation information in the form of crystallographic texture. Existing optical techniques, however, are limited by their ability to distinguish different grains. It is possible for many grains with different orientations to have the same optical contrast, which leads to errors in measuring grain size and shape. Further, none of these optical methods have the capability to determine the full three-dimensional (3D) crystal orientation.

Accordingly, there is a need to provide a simple and effective solution to determine 3D crystallographic orientation.

SUMMARY

According to various embodiments, there is provided a method of determining 3D crystallographic orientation on a crystalline surface of a sample. The method may include directing a beam of collimated light to strike a spot on the crystalline surface at a predetermined angle of incidence, wherein reflections from the crystalline surface at said spot are projected onto an image sensing unit positioned in a path of reflected light. The image sensing unit may generate an image of a reflectance pattern based on angle-dependent-reflectance of the crystalline surface sensed by the image sensing unit. The method may include obtaining a directional reflectance profile from the image of the reflectance pattern by pixelising the reflectance pattern into a pixelated-image. The pixelated-image may have a center coinciding with an intersection of a specularly reflected light beam and the image sensing unit. The pixelated-image may be divided into equal radial-pixels-segments about the center and each radial-pixels-segment may be divided into pixels in respective radial direction. The method may further include processing the directional reflectance profile based on analysing reflection intensity data in the pixelated-image of the directional reflectance profile to determine the crystallographic orientation of the crystalline surface at said spot of the crystalline surface.

According to various embodiments, there is provided an apparatus configured to perform a method of determining 3D crystallographic orientation on a crystalline surface of a sample. The apparatus may include a collimated light source configured to be disposed above the crystalline surface and to direct a beam of collimated light at a predetermined angle of incidence to strike a spot on the crystalline surface. The apparatus may include an image sensing unit disposed in a path of reflected light and configured to generate an image of a reflectance pattern based on angle-dependent-reflectance of the crystalline surface sensed by the image sensing unit. The apparatus may include a processor in communication with the image sensing unit to receive the image of the reflectance pattern. The processor may be configured to obtain a directional reflectance profile from the image of the reflectance pattern. The processor may be configured to pixelise the reflectance pattern into a pixelated-image. The pixelated-image may have a center coinciding with an intersection of a specularly reflected light beam and the image sensing unit. The pixelated-image may be divided into equal radial-pixels-segments about the center and each radial-pixels-segment may be divided into pixels in respective radial direction. The processor may be configured to process the directional reflectance profile based on analysing reflection intensity data in the pixelated-image of the directional reflectance profile to determine the crystallographic orientation of the crystalline surface at the spot which the beam of collimated light is directed.

According to various embodiments, there is provided a method of determining 3D crystallographic orientation on a crystalline surface of a sample. The method may include directing a beam of collimated light to strike a spot on the crystalline surface at a predetermined angle of incidence, wherein reflections from the crystalline surface at said spot are projected onto a detector screen positioned in a path of reflected light, thereby displaying a reflectance pattern on the detector screen. The method may further include capturing an image of the reflectance pattern on the detector screen. The method may further include obtaining a directional reflectance profile from the captured image of the reflectance pattern by pixelising the reflectance pattern into a pixelated-image. The pixelated-image may have a center coinciding with an intersection of a specularly reflected light beam and the detector screen. The pixelated-image may be divided into equal radial-pixels-segments about the center and each radial-pixels-segment may be divided into pixels in respective radial direction. The method may further include processing the directional reflectance profile based on analysing reflection intensity data in the pixelated-image of the directional reflectance profile to determine the crystallographic orientation of the crystalline surface at said spot of the crystalline surface.

According to various embodiments, there is provided an apparatus configured to perform a method of determining crystallographic orientation on a crystalline surface of a sample. The apparatus may include a collimated light source configured to be disposed above the crystalline surface and to direct the beam of collimated light at a predetermined angle of incidence to strike a spot on the crystalline surface. The apparatus may include a detector screen configured disposed in a path of reflected light so as to obtain a reflectance pattern on the detector screen. The apparatus may include an image capturing device disposed relative to the detector screen in a manner so as to capture an image of the reflectance pattern on the detector screen. The apparatus may include a processor in communication with the image capturing device to receive the image of the reflectance pattern captured by the image capturing device. The processor may be configured to obtain a directional reflectance profile from the image of the reflectance pattern captured by the image capturing device. The processor may be configured to pixelise the reflectance pattern into a pixelated-image with a center coinciding with an intersection of a specularly reflected light beam and the detector screen. The pixelated-image may be divided into the equal radial-pixels-segments about the center and each radial-pixels-segment may be divided into pixels in respective radial direction. The processor may be configured to process the directional reflectance profile based on analysing reflection intensity data in the pixelated-image of the directional reflectance profile to determine the crystallographic orientation of the crystalline surface at the spot onto which the beam of collimated light is directed.

BRIEF DESCRIPTION OF THE DRAWINGS

In the drawings, like reference characters generally refer to the same parts throughout the different views. The drawings are not necessarily to scale, emphasis instead being generally placed upon illustrating the principles of the invention. In the following description, various embodiments are described with reference to the following drawings, in which.

DETAILED DESCRIPTION

Figure 1A:
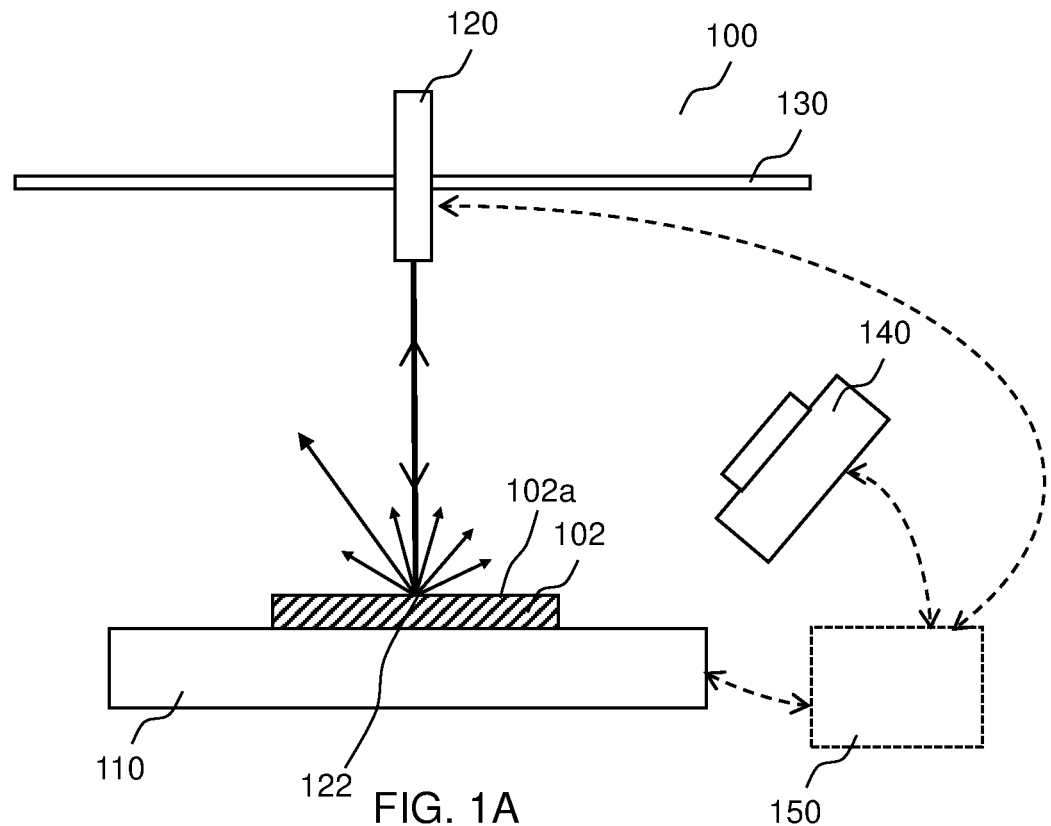
FIG. 1A and FIG. 1B are schematic diagrams showing possible arrangements of the apparatus for determining crystallographic orientation on a crystalline surface according to various embodiments.

Embodiments described below in the context of the apparatus are analogously valid for the respective methods, and vice versa. Furthermore, it will be understood that the embodiments described below may be combined. For example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

One recent method for identifying grain boundaries and distinguishing different grains on a polycrystalline surface is directional reflectance microscopy (DRM). Different grains on a polycrystalline surface often have different reflectivity. These variations can often be observed with the naked eye and this has been the basis for the metallographic observation commonplace for many decades. By eye, the contrast between grains is often heightened by rotating a sample through a variety of angles. DRM has taken advantage of this property to classify grains by imaging a sample repeatedly with an optical microscope while moving the light source to provide illumination from an array of directions. Variations in reflection intensity are caused by structural elements on the surface. Accordingly, DRM has been used to classify crystallites into categories based on the angle dependent reflectivity of the surface. However, the existing DRM method is not able to provide complete crystallographic information, specifically lacking the capacity to determine three-dimensional 3D grain orientation.

Various embodiments generally relate to a method of determining crystallographic orientation on a crystalline surface and an apparatus configured to perform the method of determining crystallographic orientation on the crystalline surface. In particular, various embodiments generally relate to an optical method of determining crystallographic orientation on a crystalline surface and an optical instrument apparatus configured to perform the method of determining crystallographic orientation on the crystalline surface. Crystallographic orientation generally refers to an orientation of a crystal lattice with respect to a coordinate system of a sample. According to various embodiments, the crystalline surface may include polycrystalline surface which may be an aggregate of small crystals with different orientation. According to various embodiments, the optical method and/or optical instrument apparatus may be based on application of optics including, but not limited to, optical radiation, propagation and phenomena observed as a result of interaction of light with the crystalline surface.

According to various embodiments, there is provided an instrument/apparatus and a methodology to take DRM measurements of a sample and use them to directly calculate the local 3D grain orientation in nearly real time. According to various embodiments, the methodology may enable commercial scale screening concurrent to the manufacturing process of large parts based on crystallographic information. These capabilities were previously unachievable even via electron- or X-ray-based methods, owing to their high cost, low-throughput, and requirement for a high-vacuum environment and specialized samples (i.e. polished and flat).

According to various embodiments, there is provided an instrument/apparatus which develops grain orientation information in analogy to electron backscatter diffraction (EBSD) using advanced data processing techniques on optical reflectance data to rapidly determine the local crystallography of a sample surface.

According to various embodiments, a sample may be selected such that the surface structure relates to the crystallography. The sample may be any crystalline material that reflects the light source in the instrument/apparatus, and such samples may be prepared by a variety of material-dependent techniques previously known. According to various embodiments, the sample may be prepared by mechanical polishing and/or grinding and/or chemical etching so as to process the surface such that it is capable of distinguishing different grains or capable of inducing directional reflectance. According to various embodiments, the sample may be placed on a sample stage such that a spot or region of interest, or the entire surface, is positioned to be illuminated by a light source. When the light source is activated, reflections from the sample surface may be projected on a detector screen. The projection on the detector screen may then be imaged by a camera. Various setups according to various embodiments are shown schematically in FIG. 1A and FIG. 1B.

Figure 3A:
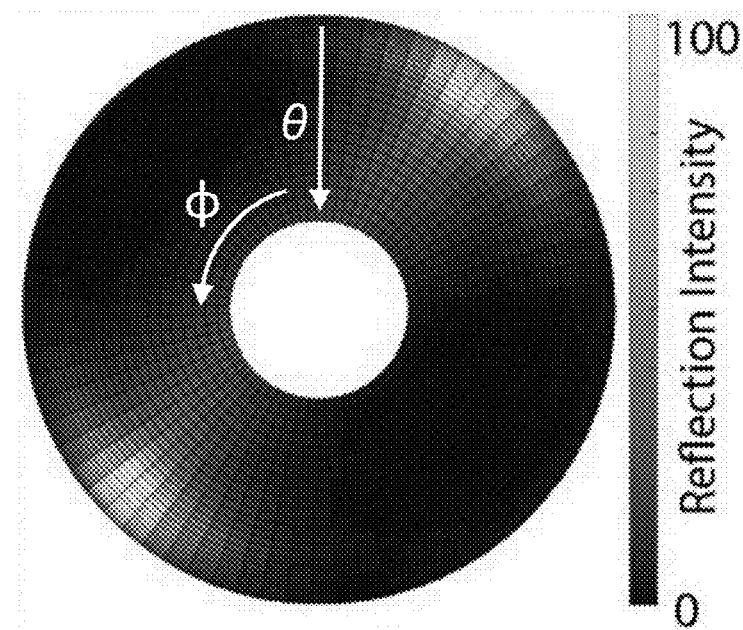
FIG. 3A shows an example of the directional reflectance profile (DRP) for a nickel surface at reflection angles theta, $\theta$, (elevation) and phi, $\varphi$, (azimuth) referenced to the surface normal to the sample.

For a perfectly flat reflective sample, there would usually be a single bright specular reflection. However, if the sample is selected and prepared properly, crystallographic features on the surface may create other reflections at different angles. The angle dependent reflectivity of an area on the sample surface is referred to as the directional reflectance profile (DRP). An example of DRP with additional reflections caused by crystallographic facets is shown in FIG. 3A.

Figure 3B:
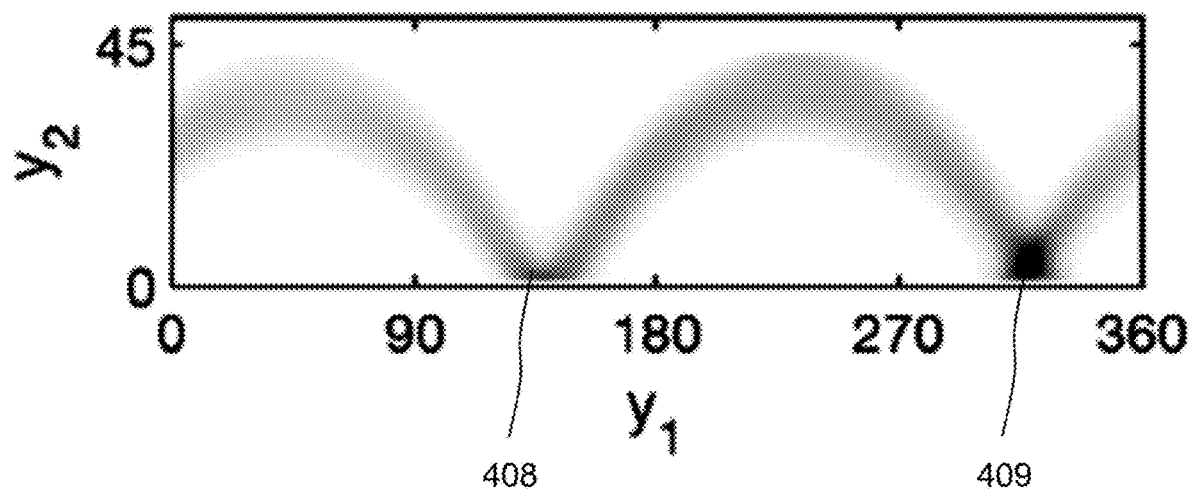
FIG. 3B shows the Funk-Radon transform (FRT) of the data from FIG. 3A, where the elevation of each point is proportional to the integrated intensity of the great circle parameterized by azimuthal rotation angle $y_1$ and elevation angle $y_2$. The two highlighted points are local maxima, corresponding to great circles which pass through significant arcs of the DRP.

According to various embodiments, once the DRP is obtained, it may then be used to determine the 3D crystallographic orientation. In many crystals, there is significant symmetry in structural elements of the crystal unit cell which may produce duplicated reflections in the DRP. Thus, data analysis accuracy may be improved if these duplicated reflections (or features) are highlighted by transforming the data. According to various embodiments, Funk-Radon transform (FRT) may be applied to the DRP, which converts the DRP raw data from the angle-space measurement (i.e. in the form of a pixelated image, or a circular shaped representation, or a circular pixelated image, or an annular disc shaped representation, or a pixelated-annular-image, or an annular-shaped-pixelated-radial image) to a space parameterized by the angles describing the elevation (0° to 90°) and azimuthal rotation (0° to 360°) of great circles, where these two angles identify a specific great circle intersecting the area of the DRP. In the FRT space, each point has a value associated with the integrated intensity along the corresponding great circle. FIG. 3B shows the FRT of the DRP presented in FIG. 3A. Crystal orientation may then be determined by a variety of numerical methods based on patterns observed on the DRP and the associated FRT.

Various embodiments may also assess crystal orientation from samples with curved (either concave or convex) surfaces. When performing measurements on a sample with a flat crystalline surface, a specular reflection of light coming from the flat crystalline surface may be predicted based on a reflected ray having a same angle with respect to the surface normal as the incident ray and the reflected ray and incident ray being on opposite sides of the surface normal. Thus, the apparatus (for example including the light source, the sample stage, the detector screen and the camera) may be setup accordingly to capture the DRP.

However, when performing measurements on a sample with a curved surface, a surface normal of the curved surface varies from point to point on the curved surface depending on the curvature of the curved surface. Thus, when the apparatus is setup based on measuring flat crystalline surface and being used on the sample with the curved surface, bright specular reflection from the curved surface, which does not provide information on the crystal orientation, may be captured in the DRP, and, these, supposedly strong, reflections may complicate orientation indexing from the DRP. In addition, specular reflection from the curved surface may also not be easily predicted as that would require knowing the surface normal of each point on the curved surface prior to performing the measurement. Even if the surface normal of each point on the curved surface were known, the light source, the sample stage, the detector screen and the camera may have to be moved and varied when capturing the DRP from different points on the curved surface.

To overcome these limitation, a "background" data set of the specular reflection for the entire curved surface of the sample may be acquired and analyzed before preparation of the surface, e.g. via polishing and/or grinding and/or etching. Such "background" data set may only contain specular reflections stemming from local sample curvature, which have no relationship with the underlying crystal orientation. This "background" data set may then be subtracted or divided from the actual DRP for each point of the curved surface of the same sample after the curved surface is prepared or processed. This operation may "erase" the contributions to local directional reflectance stemming from geometry only, i.e. the curved surface. The "normalized" data set (after background removal) may be indexed as normal. This is possible because when the surface is not flat, the main specular reflection in the DRP may describe the local surface curvature. However, all other reflections stemming from crystallographic features on the surface may still be present and may be used to determine the 3D crystallographic orientation.

According to various embodiments, the apparatus may include movable arms (e.g., motorized arm) for 3D crystallographic orientation measurements on a non-flat surface. According to various embodiments, the movable arms may move the detector screen and/or light source such that the bright specular reflection from the crystalline surface may be captured by the detector screen. Capturing of the main specular reflection (although it does not carry orientation information) may provide spatial reference coordinates for the orientation measurements. In other words, it may allow measuring the local surface normal and thus express crystallographic orientation with respect to it.

Figure 1B:
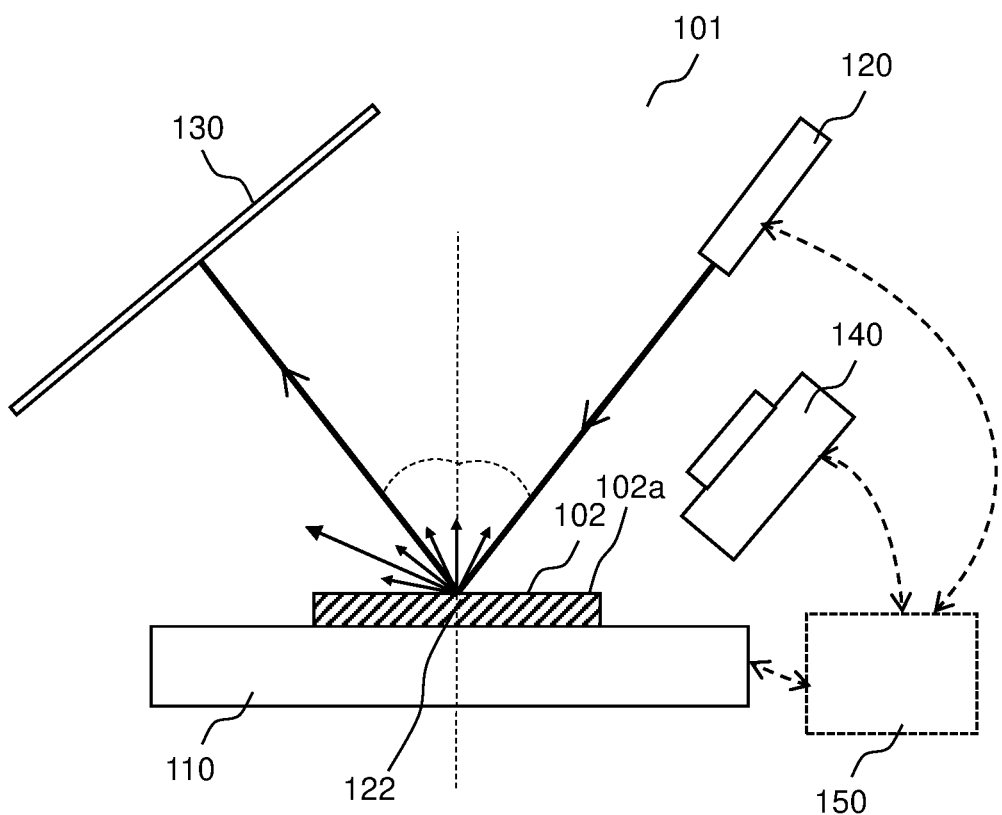

FIG. 1A and FIG. 1B shows an apparatus 100, 101 for determining crystallographic orientation on crystalline surfaces according to various embodiments. According to various embodiments, the apparatus 100, 101 may be configured to perform the method of determining crystallographic orientation on crystalline surfaces as described herein. As shown in FIG. 1A and FIG. 1B, a sample 102 may be placed on an adjustable mechanical stage 110 such that the height may be aligned to place the region or spot of interest at a spot 122 (or a predetermined point) with respect to the light source, for example a collimated light source 120. The stage 110 may also be used to translate the sample horizontally to move different areas into the illumination so the collimated light source 120 and a detector screen 130 may remain stationary. Illumination may be provided by the collimated light source 120 configured to produce a beam of collimated light, for example a laser beam. The detector screen 130 may be a light diffusing white screen. The detector screen 130 may be a flat screen. An image capturing device 140 (or imaging device, for example a camera) may be placed to capture an image of the light reflections on the detector screen 130. The image capturing device 140 may be an optical camera with sufficient spatial resolution to detect fine features of the DRP on the detector screen 130, and sufficiently rapid image capture to enable high-throughput sample characterization. The image capturing device 140, the stage 110, and the light source 120 may be all integrated with a processor 150 (or an electronic controller), that may be an embedded system or a piece of software running on an attached computer, which allows the sample to be translated and the DRP to be captured automatically. The processor 150 (or the electronic controller) may also process the DRP using the methodology described herein. In various embodiments, the detector screen 130 may be substituted by an image sensing unit (or an image sensor or an imager, for example, a large charge-coupled device (CCD) camera array) to directly detect reflection intensity with no intermediary. In essence, combining the detector screen and the image capturing device into a single object without substantively changing the apparatus or function. In other various embodiments, the light source may comprise a fixed array of light sources which are consecutively turned on.

According to various embodiments, the processor 150 (or the controller) may be understood as any kind of a logic implementing entity, which may be special purpose circuitry or a processor executing software stored in a memory, firmware, or any combination thereof. Thus, in an embodiment, a "controller/processor" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "controller/processor" may also be a processor executing software, e.g. any kind of computer program, e.g. a computer program using a virtual machine code such as e.g. Java. Any other kind of implementation of the respective functions which will be described in more detail below may also be understood as a "controller/processor" in accordance with various alternative embodiments. In various embodiments, the "controller/processor" may be part of a computing system or a controller or a microcontroller or any other system providing a processing capability. According to various embodiments, such systems may include a memory which is for example used in the processing carried out by the device or system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magneto-resistive Random Access Memory) or a PCRAM (Phase Change Random Access Memory).

Referring to FIG. 1A and FIG. 1B, according to various embodiments, a method of determining three-dimensional (3D) crystallographic orientation on the crystalline surface 102a of the sample 102 may include preparing the crystalline surface 102a via polishing, grinding, and/or etching. Accordingly to various embodiments, by preparing the crystalline surface 102a, the grains on the crystalline surface 102a may exhibit orientation-dependent facets, which may reflect light in specific directions, so as to induce directional reflectance.

According to various embodiments, the method may include directing a beam of collimated light to strike the spot 122 (or the predetermined point) on the crystalline surface 102a of the sample 102 at a predetermined angle of incidence. Accordingly, the collimated light source 120 may provide the beam of collimated light. Further, the collimated light source 120 may be disposed or arranged in a manner so as to direct the beam of collimated light to strike the spot 122 (or the predetermined point) on the crystalline surface of the sample 102. According to various embodiments, the predetermined angle of incidence may be from 0° to 80° as measured from a surface normal of the sample or the mechanical stage 110. According to various embodiments, the crystalline surface 102a may be flat or curved.

According to various embodiments, reflections from the crystalline surface 102a at said spot 122 (or the predetermined point) may be projected onto the detector screen 130 positioned in the path of reflected light, thereby obtaining or displaying a reflectance pattern on the detector screen 130. Accordingly, the detector screen 130 may display the reflectance pattern from the reflections off the spot 122 (or the predetermined point) of the crystalline surface 102a of the sample 102. According to various embodiments, the reflectance pattern may correspond to the crystallographic orientation at the spot 122 (or the predetermined point) of the crystalline surface 102a of the sample 102. According to various embodiments, the detector screen 130 may include a light diffusing white screen.

According to various embodiments, the method may include capturing an image of the reflectance pattern on the detector screen 130. Accordingly, the image capturing device 140 (or imaging device, for example the camera or the optical camera) may be disposed or arranged or positioned to capture an image of the detector screen 130. According to various embodiments, the image capturing device 140 may be disposed or arranged or positioned at various distance and angle from the detector screen 130 and the image captured by the image capturing device 140 may be corrected for perspective and/or dimension and/or scale.

According to various embodiments, the method may include obtaining a directional reflectance profile from the captured image of the reflectance pattern. Accordingly, the directional reflectance profile may be obtained from processing the image of the reflectance pattern on the detector screen 130 captured by the image capturing device 140. According to various embodiments, the processor 150 may receive the image of the reflectance pattern on the detector screen 130 captured by the image capturing device 140, process the image and obtain the directional reflectance profile. According to various embodiments, obtaining the directional reflectance profile may include processing the image captured by the image capturing device 140 for perspective correction and/or dimension correction and/or scaling correction and/or filtering.

According to various embodiments, obtaining the direction reflectance profile may include pixelising the reflectance pattern into a pixelated-image with a center coinciding with an intersection of a specularly reflected light beam and the detector screen 130. Accordingly, the center of the pixelated-image may correspond to a position of a specularly reflected light beam of the beam of collimated light on the detector screen 130. Hence, the center of the pixelated-image may correspond to a specular reflection of the collimated light source 120. According to various embodiments, the pixelated-image may be a representation or depiction of the directional reflectance profile.

According to various embodiments, obtaining the direction reflectance profile may include extracting, from the reflectance pattern, an annular portion of the reflectance pattern and pixelising the annular portion of the reflectance pattern into a pixelated-annular-image with an annulus-center coinciding with an intersection of a specularly reflected light beam and the detector screen 130. Accordingly, the annulus-center of the pixelated-annular-image may correspond to a position of a specularly reflected light beam of the beam of collimated light on the detector screen 130. Hence, the annulus-center of the pixelated-annular-image may correspond to a specular reflection of the collimated light source 120. Further, a region of the reflectance pattern surrounding the position of the specularly reflected light beam of the beam of collimated light on the detector screen 130 may be omitted or excluded so as to form the pixelated-annular-image. Accordingly, a circular potion of the reflectance pattern with a center coinciding with the annulus-center of the pixelated-annular-image may be omitted or excluded to form the pixelated-annular-image. According to various embodiments, the pixelated-annular-image may be a representation or depiction of the directional reflectance profile.

According to various embodiments, the pixelated-image may be divided into equal radial-pixels-segments about the center. Accordingly, each radial-pixels-segment may be a sector of the pixelated-image between two radii extending from the center. According to various embodiments, the pixelated-annular-image may be the annular portion of the reflectance pattern divided into equal radial-pixels-segments about the annulus-center. According to various embodiments, each radial-pixels-segment may be enclosed between two radii, a portion of an outer circumference and a portion of an inner circumference. Accordingly, each radial-pixels-segment may be a sector of the pixelated-annular-image. According to various embodiments, each radial-pixels-segment may have a same angular distance or angle, or the pixelated-annular-image may be equally divided angularly into the radial-pixels-segments.

According to various embodiments, each radial-pixels-segment may be divided into pixels in respective radial direction. Accordingly, each radial-pixels-segment may be divided radially into pixels. Hence, each radial-pixels-segment may include a row of pixels extending along the respective radial direction.

According to various embodiments, the method may include processing the directional reflectance profile based on analysing reflection intensity data in the pixelated-image (or the pixelated-annular-image) of the directional reflectance profile to determine the crystallographic orientation of the crystalline surface 102a at the spot 122 (or the predetermined point) of the crystalline surface 102a. According to various embodiments, each pixel of the pixelated-image (or the pixelated-annular-image) may contain reflection intensity data. Accordingly, the pixelated-image (or the pixelated-annular-image) may be processed taking into consideration the reflection intensity data along with the azimuth and elevation information of the pixelated-image (or the pixelated-annular-image) to determine the crystallographic orientation at the spot 122 (or the predetermined point) of the crystalline surface 102a. The azimuth information of the pixelated-image (or the pixelated-annular-image) may correspond to an angular location of the pixel and the elevation information of the pixelated-image (or the pixelated-annular-image) may correspond to a radial location of the pixel. Hence, the crystallographic orientation at the spot 122 (or the predetermined point) of the crystalline surface 102a may be determined from the reflection intensity data, the azimuth information and the elevation information from the pixelated-image (or the pixelated-annular-image) representing or depicting the directional reflectance profile.

According to various embodiments, processing the directional reflectance profile may include transforming local-reflection-intensity-data of the pixels of the pixelated-image (or the pixelated-annular-image) of the directional reflectance profile to integrated-reflection-intensity-data along great circles of the directional reflectance profile. Each great circle may be parameterized by an azimuth angle of the great circle and an elevation angle of a respective plane containing the great circle. Accordingly, reflection intensity data of pixels along a great circle may be unified or combined or incorporated as a whole to generate the integrated-reflection-intensity-data. According to various embodiments, each great circle may be described by the azimuth angle which the great circle intersect a reference plane (for example a horizontal plane or an azimuth plane) and the elevation angle (or inclination angle) of the great circle with respect to the reference plane.

According to various embodiments, transforming the local-reflection-intensity-data of the pixels to the integrated-reflection-intensity-data along the great circles may include applying a Funk-Radon transform to the local-reflection-intensity-data of the pixels of the directional reflectance profile. Accordingly, Funk-Radon transform may be applied to the local-reflection-intensity-data of the pixels of the directional reflectance profile for generating the integrated-reflection-intensity-data along the great circles.

According to various embodiments, processing the directional reflectance profile may include determining the great circle with a highest value of the integrated-reflection-intensity-data and using the azimuth angle and the elevation angle of the great circle to determine the crystallographic orientation at the spot 122 (or the predetermined point) of the crystalline surface 102a. According to various embodiments, the great circle identified with the highest integrated-reflection-intensity-data may correspond to the great circle containing relevant crystallographic features. According to various embodiments, processing the directional reflectance profile may include determining two great circles with the highest two values of the integrated-reflection-intensity-data and using the azimuth angles and the elevation angles of the two great circles to determine the crystallographic orientation at the spot 122 (or the predetermined point) of the crystalline surface 102a. According to various embodiments, using the azimuth angles and the elevation angles of the two great circles may provide full orientation information of the spot 122 (or the predetermined point) of the crystalline surface 102*a*.

According to various embodiments, when the crystalline surface 102*a* of the sample 102 is curved (or non-flat), the method may include, prior to preparing the crystalline surface 102*a*, directing the beam of collimated light to strike the spot 122 (or the predetermined point) on the crystalline surface 102*a* of the sample 102 at the predetermined angle of incidence so as to obtain background reflectance pattern on the detector screen 130. The background reflectance pattern may only contain specular reflections stemming from a curvature of the spot 122 (or the predetermined point) on the crystalline surface 102*a* which may not contain any directional reflectance due to the crystallographic orientation on the crystalline surface 102*a*.

According to various embodiments, the method may include capturing an image of the background reflectance pattern on the detector screen 130. According to various embodiments, the background reflectance pattern may be sent to the processor 150 and/or be stored.

According to various embodiments, obtaining the directional reflectance profile when the crystalline surface 102*a* of the sample 102 is curved may further include subtracting or dividing the background reflectance pattern from the reflectance pattern of reflections from the prepared crystalline surface 102*a* as captured by the image capturing device 140 prior to extracting the annular portion of the reflectance pattern. According to various embodiments, the image of the reflectance pattern on the detector screen 130 captured by the image capturing device 140 may be processed to subtract or divide the background reflectance pattern so as to remove the specular reflections due to the curvature of the spot 122 (or the predetermined point) on the crystalline surface 102*a*. With the specular reflections due to the curvature of the spot 122 (or the predetermined point) on the crystalline surface 102*a* removed, the processed reflectance pattern may only contain reflections due to the crystallographic orientation at the spot 122 (or the predetermined point) on the crystalline surface 102*a*. The processed reflectance pattern may then be the processed as per the method as described earlier.

According to various embodiments, the apparatus 100, 101 may be configured to perform the method of determining 3D crystallographic orientation on the crystalline surface 102*a* of the sample 102 as described above. According to various embodiments, the apparatus 100, 101 may include the collimated light source 120 configured to be disposed above the crystalline surface 102*a* and to direct the beam of collimated light at the predetermined angle of incidence to strike the spot 122 on the crystalline surface 102*a*. According to various embodiments, the collimated light source 120 may be held by a stand or a support structure or a staging in a manner so as to suspend the collimated light source 120 above the crystalline surface 102*a* of the sample 102. According to various embodiments, the collimated light source 120 may include a laser.

According to various embodiments, the apparatus 100, 101 may include the detector screen 130 configured to be disposed in the path of reflected light so as to obtain the reflectance pattern on the detector screen 130. According to various embodiments, the detector screen 130 may be held by a stand or a support structure or a staging in a manner so as to suspend the detector screen 130 above the crystalline surface 102*a* of the sample 102. According to various embodiments, the collimated light source 120 and the detector screen 130 may be disposed together so as to be directly above the crystalline surface 102*a* of the sample 102 as shown in FIG. 1A. According to various embodiments, the collimated light source 120 and the detector screen 130 may be spaced apart from each other in a manner so as to be in mirroring positions with respect to a line of symmetry extending vertically from the spot 122 on the crystalline surface 102*a* as shown in FIG. 1B.

According to various embodiments, the apparatus 100, 101 may include the image capturing device 140 disposed relative to the detector screen 130 in a manner so as to capture the image of the reflectance pattern on the detector screen 130. According to various embodiments, the image capturing device 140 may include a camera. According to various embodiments, the image capturing device 140 disposed may be disposed at an angle from the detector screen 130 or directly opposing the detector screen 130. According to various embodiments, an optical axis of the image capturing device 140 may be directed towards the side of the detector screen 130 which the reflectance pattern is displayed.

According to various embodiments, the apparatus 100, 101 may include the processor 150 in communication with the image capturing device 140 to receive the image of the reflectance pattern on the detector screen 130 captured by the image capturing device 140. According to various embodiments, the processor 150 may control the image capturing device 140, via sending an imaging control signal to the image capturing device 140, to capture the image of the reflectance pattern on the detector screen 130. According to various embodiments, the processor 150 may also control the collimated light source 120, via sending a lighting control signal to the collimated light source 120, to activate and/or deactivate the collimated light source 120 for directing the beam of collimated light to strike the spot 122 on the crystalline surface 102*a*. According to various embodiments, the processor 150 may coordinate the collimated light source 120 and the image capturing device 140 for directing, via the collimated light source 120, the beam of collimated light at the spot 122 on the crystalline surface 102*a* to produce the reflectance pattern on the detector screen and for capturing, via the image capturing device 140, the reflectance pattern on the detector screen. According to various embodiments, the image capturing device 140 may send the image of the reflectance pattern on the detector screen 130 captured to the processor 150.

According to various embodiments, the processor 150 may be configured to obtain the directional reflectance profile from the captured image of the reflectance pattern. According to various embodiments, the processor 150 may receive the image of the reflectance pattern on the detector screen 130 captured by the image capturing device 140, process the image and obtain the directional reflectance profile. According to various embodiments, the processor 150 may process the image captured by the image capturing device 140 for perspective correction and/or dimension correction and/or scaling correction and/or filtering.

According to various embodiments, the processor 150 may pixelise the reflectance pattern into the pixelated-image with the center coinciding with the intersection of the specularly reflected light beam and the detector screen 130. According to various embodiments, the processor 150 may determine the center via various methods including, but not limited to, image processing to determine a center of a bright specular reflected spot around a predicted specular reflection region on the detector screen 130 or based on a pre-defined image coordinate for the center or based on calculation of an axis of incidence and an axis of reflection or a combination thereof.

According to various embodiments, the processor 150 may generate the pixelated-image by dividing the reflectance pattern into the equal radial-pixels-segments about the center and dividing each radial-pixels-segment into pixels in respective radial direction. Accordingly, the processor 150 may divide the reflectance pattern into equal sectors with respect to the center and further divide each sector into pixels in the radial direction.

According to various embodiments, the processor 150 may extract the annular portion of the reflectance pattern and pixelise the annular portion of the reflectance pattern into the pixelated-annular-image with the annulus-center coinciding with the intersection of the specularly reflected light beam and the detector screen 130. According to various embodiments, the processor 150 may determine the annulus-center via various methods including, but not limited to, image processing to determine a center of a bright specular reflected spot around a predicted specular reflection region on the detector screen 130 or based on a pre-defined image coordinate for the annulus-center or based on calculation of an axis of incidence and an axis of reflection or a combination thereof.

According to various embodiments, the processor 150 may generate the pixelated-annular-image by dividing the annular portion of the reflectance pattern into the equal radial-pixels-segments about the annulus-center and dividing each radial-pixels-segment into pixels equally in respective radial direction. Accordingly, the processor 150 may divide the annular portion of the reflectance pattern into equal sectors with respect to the annulus-center and further divide each sector equally into pixels in the radial direction.

According to various embodiments, the processor 150 may be configured to process the directional reflectance profile based on analysing the reflection intensity data in the pixelated-image (or the pixelated-annular-image) of the directional reflectance profile to determine the crystallographic orientation of the crystalline surface 102*a* at the spot 122 which the beam of collimated light is directed. According to various embodiments, the processor may analyse the reflection intensity data along with the azimuth and elevation information of the pixelated-image (or the pixelated-annular-image) to determine the crystallographic orientation at the spot 122 (or the predetermined point) of the crystalline surface 102*a*. Accordingly, the processor 150 may determine the crystallographic orientation at the spot 122 (or the predetermined point) of the crystalline surface 102*a* from the reflection intensity data, the azimuth information and the elevation information contained in the pixelated-image (or the pixelated-annular-image) representing or depicting the directional reflectance profile.

According to various embodiments, the processor 150 may be configured to transform the local-reflection-intensity-data of the pixels of the pixelated-image (or the pixelated-annular-image) of the directional reflectance profile to the integrated-reflection-intensity-data along the great circles of the directional reflectance profile. Each great circle may be parameterized by the azimuth angle of the great circle and the elevation angle of a respective plane containing the great circle. Accordingly, the processor 150 may unify or combine or incorporate reflection intensity data of pixels along a great circle as a whole to generate the integrated-reflection-intensity-data. According to various embodiments, the processor 150 may describe each great circle by the azimuth angle which the great circle intersect a reference plane (for example a horizontal plane or an azimuth plane) and the elevation angle (or inclination angle) of the great circle with respect to the reference plane. Accordingly, the processor 150 may associate the integrated-reflection-intensity-date to the azimuth angle and the elevation angle describing the great circle.

According to various embodiments, the processor 150 may be configured to apply a Funk-Radon transform to transform the local-reflection-intensity-data of the directional reflectance profile so as to transform the local-reflection-intensity-data of the pixels to the integrated-reflection-intensity-data along the great circles. Accordingly, the processor 150 may generate the integrated-reflection-intensity-data along the great circles from applying the Funk-Radon transform to the local-reflection-intensity-data of the pixels of the directional reflectance profile.

According to various embodiments, the processor 150 may be configured to determine the great circle with the highest value of the integrated-reflection-intensity-data and use the azimuth angle and the elevation angle of the great circle to determine the crystallographic orientation at the spot 122 (or the predetermined point) of the crystalline surface 102*a*. Accordingly, the processor 150 may determine the crystallographic orientation at the spot 122 (or the predetermined point) of the crystalline surface 102*a* based on the great circle with the highest value of the integrated-reflection-intensity-data. According to various embodiments, the processor 150 may be configured to determine two great circles with the highest two values of the integrated-reflection-intensity-data and using the azimuth angles and the elevation angles of the two great circles to determine the crystallographic orientation at the spot 122 (or the predetermined point) of the crystalline surface 102*a*. Accordingly, the processor 150 may determine the crystallographic orientation at the spot 122 (or the predetermined point) of the crystalline surface 102*a* based on the two great circles with the highest two values of the integrated-reflection-intensity-data.

According to various embodiments, the apparatus 101 may further include the movable stage 110 on which the sample 102 with the crystalline surface 102*a* may be placed. According to various embodiments, the movable stage 110 may be actuated. According to various embodiments, the movable stage 110 may include a motorized linear translation stage movable along an x-axis and an y-axis along a movement plane. According to various embodiments, the processor 150 may be in communication with the movable stage 110 so as to control an actuation of the movable stage 110 to position the sample 102 relative to the collimated light source 120 such that the beam of collimated light may strike on a desired spot of the crystalline surface 102*a* of the sample 102. Accordingly, the processor 150 may send a movement control signal to the movable stage 110 to move the sample 102, while the detector screen 130, the collimated light source 120 and the image capturing device 140 may remain stationary, so as to determine the 3D crystallographic orientation of all the points on the crystalline surface 102*a* of the sample 102 for mapping the grain orientations of the crystalline surface 102*a* of the sample 102.

Figure 5:
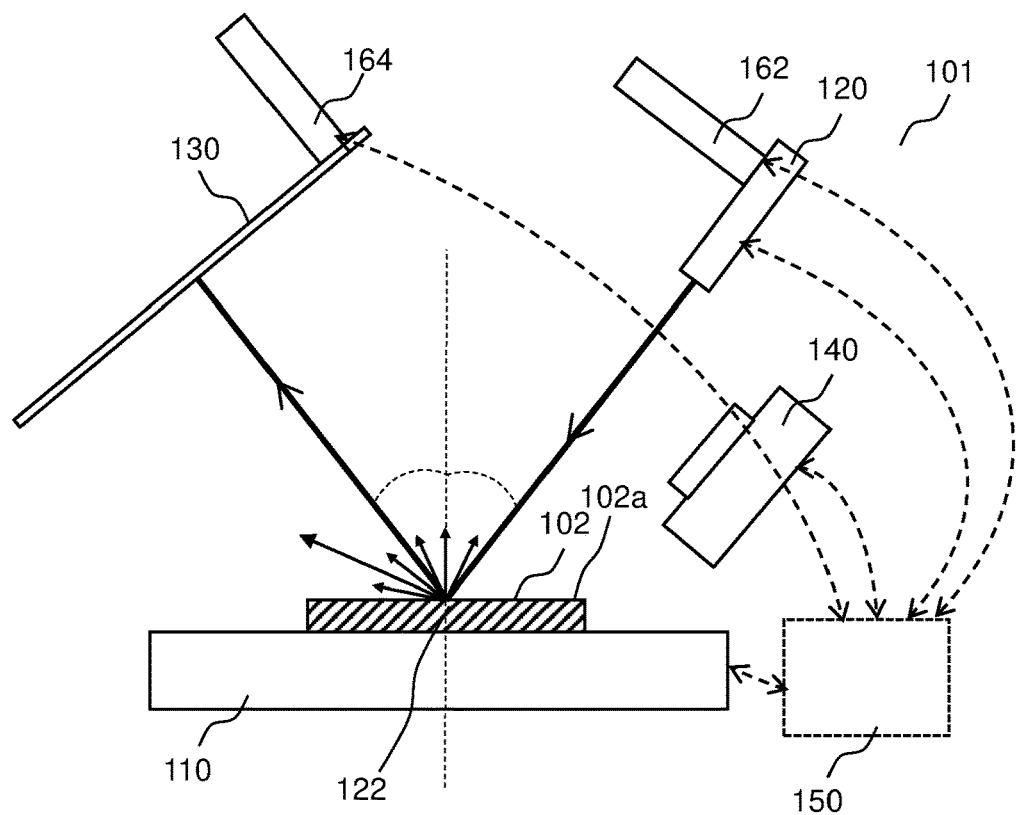
FIG. 5 shows the apparatus of FIG. 1B further including a pair of movable arms according to various embodiments.

FIG. 5 shows the apparatus 101 of FIG. 1B further including a pair of movable arms 162, 164. One of the movable arms (or a first movable arm 162) may be coupled to the collimated light source 120 and the other one of the movable arms (or a second movable arm 164) may be coupled to the detector screen 130. According to various embodiments, the pair of moveable arms 162, 164 may be actuated. According to various embodiments, the pair of movable arms 162, 164 may include, but not limited to, a pair of motorized manipulators, or a pair of robotic arms, or a pair of multi-axis actuators. According to various embodiment, the processor 150 may be in communication with the pair of movable arms 162, 164 so as to control an actuation of the pair of movable arms 162, 164 to position the collimated light source 120 and the detector screen 130 such that the beam of collimated light may strike on the desired spot of the crystalline surface 102a of the sample 102 and the detector screen 130 may be positioned to display the reflectance pattern obtained by the reflections from the crystalline surface 102a at said spot. Accordingly, the processor 150 may send an actuation control signal to the pair of movable arms 162, 164 to move the collimated light source 120 and the detector screen 130.

According to various embodiments, when the crystalline surface 102a of the sample 102 is curved, the processor 150 may control the pair of movable arms 162, 164 so as to capture the bright specular reflection from the spot 122 of the curved crystalline surface 102a on the detector screen 130 for determining a local surface normal of the spot 122 such that crystallographic orientation thereof may be expressed with respect to the local surface normal of the spot 122.

Figure 6:
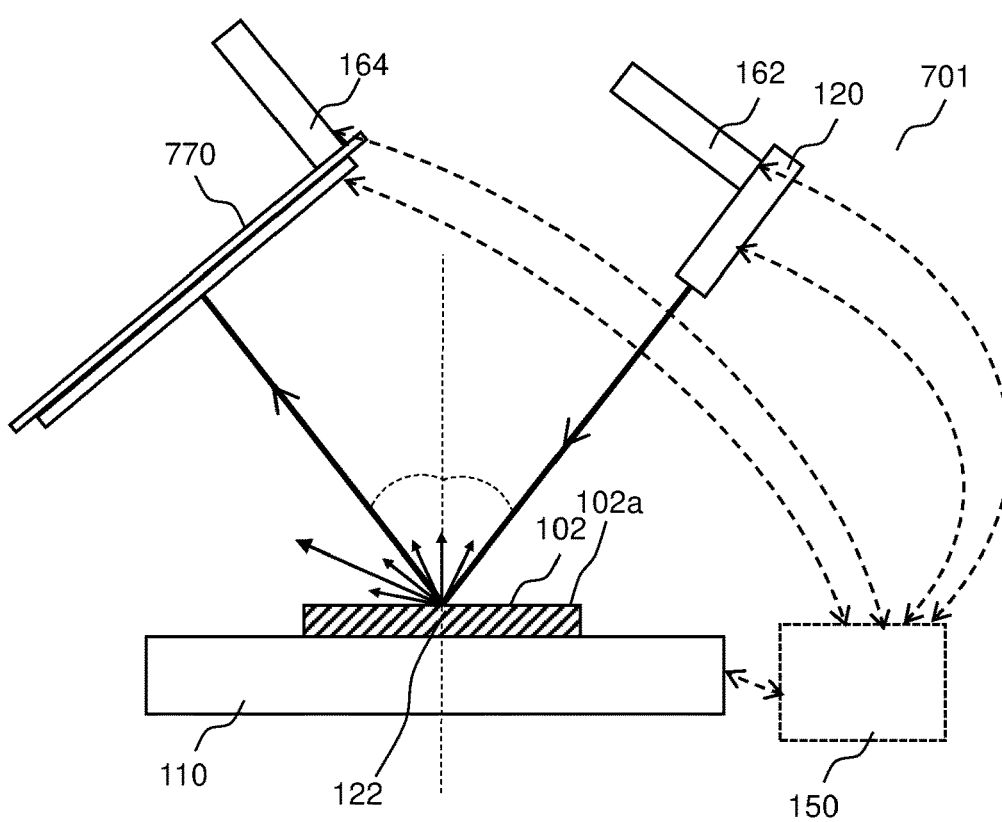
FIG. 6 shows a variant of the apparatus 701 for determining crystallographic orientation on crystalline surfaces according to various embodiments.

FIG. 6 shows a variant of the apparatus 701 for determining crystallographic orientation on crystalline surfaces according to various embodiments. According to various embodiments, the apparatus 701 may, similar to the apparatus 100 of FIG. 1A as well as the apparatus 101 of FIG. 1B and FIG. 5, be configured to perform the method of determining crystallographic orientation on crystalline surfaces according to the various embodiments as described herein. According to various embodiments, the apparatus 701 may differ from the apparatus 100 of FIG. 1A as well as the apparatus 101 of FIG. 1B and FIG. 5 in that the apparatus 701 includes an image sensing unit 700 (or an image sensor or an imager) instead of the detector screen 130 and the image capturing device 140. According to various embodiments, the remaining features and limitations of the apparatus 701 may be similar or identical with that of the apparatus 100 of FIG. 1A and/or the apparatus 101 of FIG. 1B and FIG. 5. Accordingly, the apparatus 701 of FIG. 6 may substitute or replace the detector screen 130 by the image sensing unit 770 to directly detect reflectance pattern without intermediary. Accordingly, the image capturing device 140 of the apparatus 100 of FIG. 1A as well as the apparatus 101 of FIG. 1B and FIG. 5 may no longer be necessary in the apparatus 701 of FIG. 6. According to various embodiments, the image sensing unit 770 of the apparatus 701 of FIG. 6 may include, but not limited to, a large charge-coupled device (CCD) sensor, a large complementary-metal-oxide-semiconductor (CMOS) sensor, multiple CCD sensors arrangement, multiple CMOS sensors arrangement, or a light matrix sensor.

According to various embodiments, similar to the detector screen 130, the image sensing unit 770 of the apparatus 701 of FIG. 6 may be held by a stand or a support structure or a staging in a manner so as to suspend the detector screen 130 above the crystalline surface 102a of the sample 102. According to various embodiments, similar to the detector screen 130, one of the movable arms (or the second movable arm 164) may be coupled to the image sensing unit 770 of the apparatus 701 of FIG. 6. Accordingly, the image sensing unit 770 of the apparatus 701 of FIG. 6 may be disposed, held or moved in a manner similar to that of the detector screen 130.

According to various embodiments, with the apparatus 701 of FIG. 6, the method of determining crystallographic orientation on crystalline surfaces may skip the step of capturing the image of the reflectance pattern on the detector screen 130, which is associated with image capturing device 140 of the apparatus 100 of FIG. 1A as well as the apparatus 101 of FIG. 1B and FIG. 5, because the image sensing unit 770 may directly generate the image of the reflectance pattern by directly sensing the reflectance pattern reflected onto the image sensing unit 770 of the beam of collimated light directed to the spot 122 on the crystalline surface 102a. Accordingly, the image sensing unit 770 of the apparatus 701 of FIG. 6 may be positioned and disposed in the path of reflected light to actively sense the reflectance pattern. Therefore, the method of determining crystallographic orientation using the apparatus 701 of FIG. 6 may differ from the method of determining crystallographic orientation using the apparatus 100 of FIG. 1A as well as the apparatus 101 of FIG. 1B and FIG. 5 in that the apparatus 701 of FIG. 6 may not require to use the detector screen 130 to display the reflectance pattern and the separate image capturing device 140 to capture the image of the reflectance pattern displayed on the detector screen 130. Rather, the apparatus 701 of FIG. 6 may use the single image sensing unit 770 to directly sense and generate the image of the reflectance pattern that is reflected onto the image sensing unit 770. According to various embodiments, the method may include obtaining the directional reflectance profile directly from the image of the reflectance pattern sensed by the image sensing unit 770. The subsequent steps of processing the image of the reflectance pattern sensed by the image sensing unit 770 may be similar or identical with that of the image of the reflectance pattern on the detector screen 130 captured by the image capturing device 140.

Figure 2A:
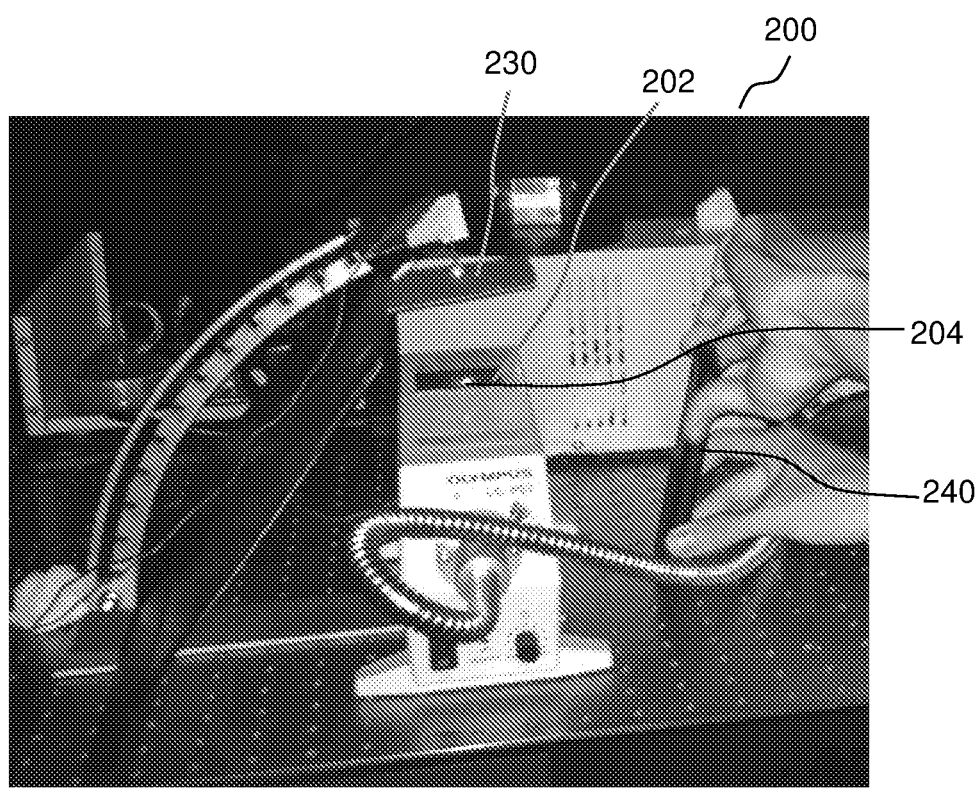
FIG. 2A shows an experimental apparatus for determining crystallographic orientation on crystalline surfaces according to various embodiments.

FIG. 2A shows an experimental apparatus 200 for determining crystallographic orientation on crystalline surfaces according to various embodiments. As shown, a laser 204 shines downward onto a sample 202 (polycrystalline silicon) which creates the directional reflectance profile (DRP) pattern on the screen 230 suspended above. An image of the screen 230 is captured by a camera 240 of a mobile phone to the right.

Figure 2B:
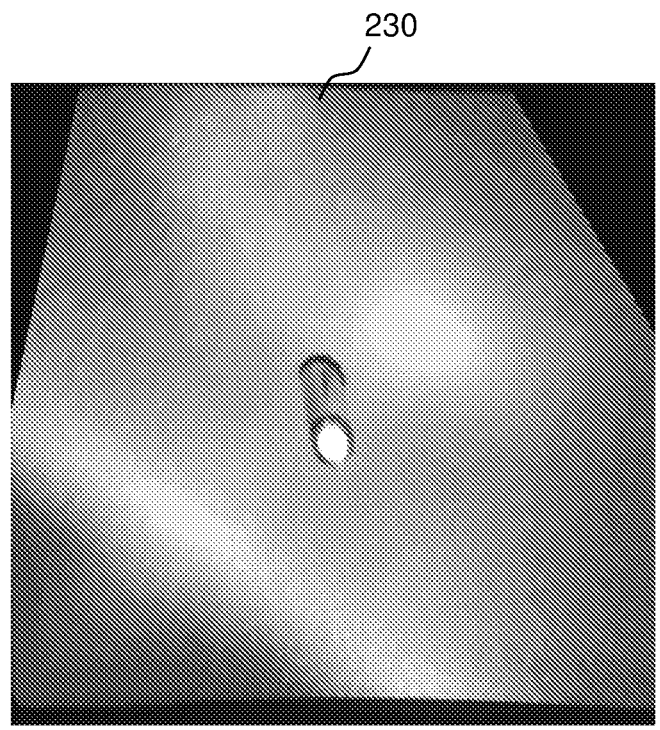
FIG. 2B shows a processed image of the screen of the experiment apparatus of FIG. 2A, after perspective correction and filtering, showing several directional reflectance peaks.

FIG. 2B shows a processed image of the screen 230, after perspective correction and filtering, showing several directional reflectance peaks.

FIG. 3A shows an example of a directional reflectance profile (DRP) for a nickel surface at reflection angles $\theta$ (elevation) and $\varphi$ (azimuth) referenced to the surface normal to the sample.

FIG. 3B shows the Funk-Radon transform (FRT) of the DRP from FIG. 3A, where the value at each point corresponds to the integrated intensity along the circumference of the great circle parameterized by azimuthal rotation angle $y_1$ and elevation angle $y_2$. The two highlighted points 408, 409 are local maxima, corresponding to great circles which pass through significant arcs of the DRP.

Referring to the example in FIG. 3A and FIG. 3B, data analysis for a DRP from a surface of crystalline elemental nickel (Ni) is described in the following. The surface of crystalline elemental nickel has been etched such that the surface structure is dominated by microscopic (111)-type facets, which produce a DRP with peaks corresponding to specular reflections from said facets. Because all the specular reflections from said facets may lie along great circles around the crystal which pass through the (111)-type directions (i.e. a normal direction of the microscopic (111)-type facets), it is of interest to transform the DRP to find the integrated intensity along all the relevant great circles. The highest-valued points on the FRT may be identified, which correspond to the great circles containing (111)-type directions. The results from this process are shown in FIG. 3B, with two marked points 408, 409 indicating the two highest intensity great circles. Using the angle parameters from these highest-valued great circles, the full orientation information of the relevant area of surface may be calculated.

Figure 4:
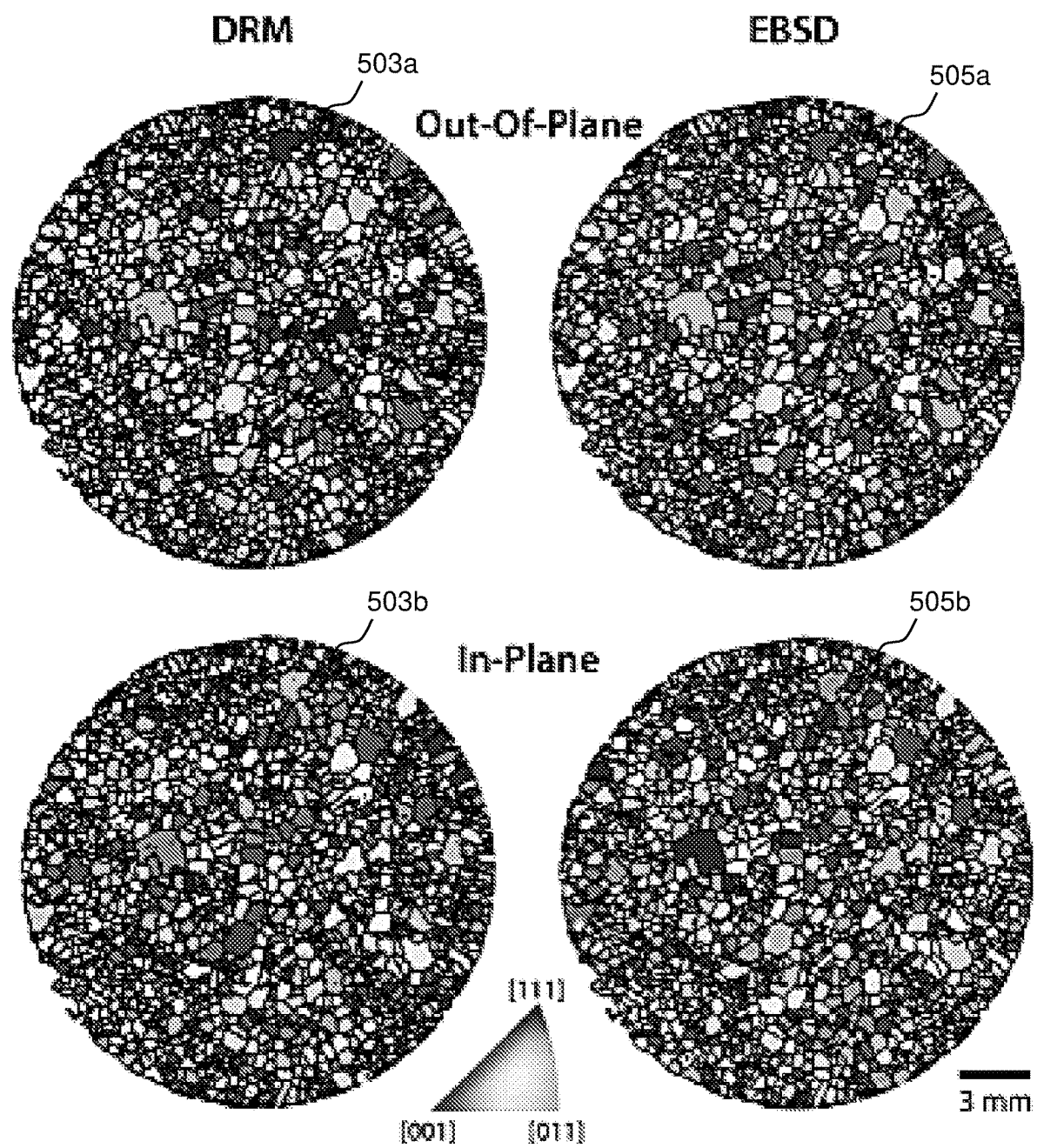
FIG. 4 shows a comparison of a map of grain orientation produced by DRM to another map measured by EBSD with data processed by commercial software.

According to various embodiments, by grouping areas of the surface with similar DRP characteristics, the extent of crystallites on the surface may be mapped. Performing the FRT and fitting process on the averaged DRP for each crystallite may produce a map of orientations on the sample surface. For compatibility with existing literature, the 3D orientation of grains is often parameterized by a set of three Euler angles. FIG. 4 shows the final result of this analysis, comparing out-of-plane map 503*a* and in-plane map 503*b* of grain orientation along the sample surface normal produced by DRM to out-of-plane map 505*a* and in-plane map 505*b* measured by EBSD with data processed by commercial software, respectively. In the analysis, the method according to various embodiments may be applied to data gathered from a nickel surface specifically, but the same methodology may be used without modification for any material with cubic symmetry, including most metals and alloys and many ceramics, and which may be prepared with predominantly (111)-type facets on the surface.

Various embodiments have provided a method of determining 3D crystallographic orientation on a crystalline surface and an apparatus configured to perform the method of determining crystallographic orientation on the crystalline surface. In the various embodiments, the light source and the detector screen may remain fixed in place and the sample may move relative to them. The reflectance from shining a beam of collimated light at a single point on the sample may now be obtained and measured at all angles simultaneously so as to instantly capturing the entire DRP directly with an optical camera. This may have advantages depending on the type of sample and features of interest. The method and apparatus according to various embodiments may be particularly beneficial when a specific type of feature is of interest, because the measurement may be stopped as soon as such a feature is found. In contrast, when imaging the entire sample in conventional optical microscopy, the entire dataset must be collected and them compiled and analyzed to determine the orientation at any given location. Furthermore, when measuring point-by-point according to the various embodiments, the orientation of the location under illumination may be determined in real-time. This may potentially be very valuable for some types of industrial defect detection.

According to various embodiments, the apparatus may be fixed in position so samples may rapidly move under the light source for real-time (or "live") orientation detection. For very large samples, like complete industrial castings, a self-contained system may be built which takes a measurement while suspended above the sample. This system may then be translated above the sample, removing the need to move or even physically contact the sample to perform this kind of crystallographic characterization.

Various embodiments have provided an optical instrument or apparatus which uses directional reflectance of light from a sample surface to calculate local crystallographic information about the sample.

According to various embodiments, the instrument or apparatus may use illumination from a single direction to measure directional reflectance from a point on the sample.

According to various embodiments, the instrument or apparatus may include an optical camera and/or a mechanical sample stage.

According to various embodiments, the instrument or apparatus may use a light source where either illumination or detector moves to measure directional reflectance from different angles.

According to various embodiments, the instrument or apparatus may include a microscope and moveable light source.

Various embodiments have provided an equipment, including any or all of a light source, a controller, and a data analysis hardware or software, which allows the use of an optical microscope to perform as the instrument or apparatus according to the various embodiments.

Various embodiments have provided an optical microscopy instrument (or apparatus) including: a capturing system having an optical sensor, a light source, and a sample stage that are movable relative to each other for capturing a directional reflectance profile (DRP) from a sample surface at different angles; and an analysis system for applying a Funk-Radon transformation (FRT) to the DRP, and for determining the local crystallography of the sample surface based on the Funk-Radon transformed DRP.

Various embodiments have provided a method for determining sample surface crystallography including: obtaining a DRP for individual regions across a sample surface; applying FRT to the DRP to the individual regions; and mapping the crystallography of the sample surface by grouping the regions of the surface with similar Funk-Radon transformed DRP.

As an example, the application of the FRT to the DRP is described in the following. According to various embodiments, a discrete implementation of the FRT may be applied to convert a DRP parametrized by $\varphi$ and $\theta$ into a function of great circle angular coordinates $(y_1, y_2)$. The FRT may be the polar coordinate version of a linear Hough transform operation used to index diffraction patterns in EBSD. Mathematically, the FRT may be expressed as $$FRTf(x) = \int_{u \in C(x)} f(u)ds(u) \tag{1}$$

where $FRT f(x)$ denotes the FRT of a function, $f(x)$, which expresses the reflectance intensity in the DRP. The basis of great circles along which to integrate is defined on the sphere $S^2$. Each individual great circle $C(x)$ may be formed by a set of vectors, u. This set may be defined in terms of the normal vector x by $$C(x) = \{\mu \in S^2 | x \cdot u = 0\} \tag{2}$$

The FRT integral may be evaluated by integrating all u for each great circle $C(x)$ in the set of great circles of interest, where $f(u)$ may be the value of the function along the direction of u and $ds(u)$ may be the arc length of the great circle associated with u. According to various embodiments, x may be parameterize by the elevation, $y_1$, and azimuthal, $y_2$, angles. Some great circles may be omitted from FRT because they will never intersect the domain of the DRP. One such instance is the great circle that coincides with the equatorial line in the sample reference frame. Thus, only the angle pairs corresponding to each remaining great circle may be identified. Using this correspondence, a fourth order tensor, T, describing the discrete FRT, F, from a DRP, R, may be populated by $$F_{y_1 y_2} = T_{y_1, y_2, \varphi, \theta} \cdot R_{\varphi, \theta} \tag{3}$$

According to various embodiments, each point on the DRP may be transformed into a curve on the FRT containing all the great circles which intersect at that point. A pair of points in the DRP may transform in two curves in the FRT, whose intersection identifies the great circle connecting the two points. An arc on the DRP may transform to a stand-alone peak in the FRT space. Once T has been computed, equation (3) may be applied to transform any DRP into the corresponding FRT.

According to various embodiments, the FRT matrix may be plotted to visualize the integrated intensity along great circles in a $y_1$-$y_2$ Cartesian space. The great circle which contains the most total reflection intensity in a DRP may be identified by locating the global maximum in the corresponding FRT. Using the FRT to identify this great circle has the advantage of increasing the orientation-dependent information that may be extrapolated from DRPs by considering reflectance peaks and reflectance bands together, as opposed to using fitting based methods on DRPs directly.

According to various embodiments, grain orientation may be calculated from directional reflectance according to the following.

According to various embodiments, for each grain, the median value of the constituent pixels may be taken to build a representative DRP and perform the FRT operation according to equation (3). The DRP and FRT together may form the input to an orientation indexing algorithm. Three angles may be required to specify the 3D orientation of a crystal. The FRT maximum may provide the coordinates ($y_1$, $y_2$) of the maximum great circle. The third angle may describe where on that great circle a $\langle 111 \rangle$ vector may be found. According to various embodiments, this third angle may be calculated, depending on features of the DRP and FRT. If the FRT has a second local maximum, the intersection between this second great circle and the global maximum, which lies along a $\langle 111 \rangle$ vector, may be used. In situations where only one great circle may be found, the DRP may be examined directly to derive the third angle from the ($\varphi$, $\theta$) coordinates of the reflectance peak. According to various embodiments, to provide additional precision, the location of the reflectance peak may be interpolated with a simple quadratic fit independently along both $\varphi$ and $\theta$. Grains with reflectance peaks that lie near the edge or outside the viewing area of the DRP may require specialized analysis to accurately calculate the location of the peak center or correctly identify the optimal great circle.

According to various embodiments, then reflectance peaks fall below the low-$\theta$ edge of the DRP—as it is for near [001]-oriented grains—only the peaks tail may be visible. Plotting the reflection intensity in this tail as a function of $\mu$ may show how the reflectance decays as a function of distance from the reflection center. A Lorentzian or Cauchy distribution may empirically fit this decay well in most cases, and the center of the peak may be estimated based on the fitting parameters of the distribution.

According to various embodiments, when the DRP maximum occurs at high-$\theta$ angles—as it is for near [111]-oriented grains—the peak center may fall within the gap in the DRP domain caused by obstruction of the camera. In this case, the most important features on the DRP may be the bands which originate from this central reflectance peak. These bands may lie on relevant great circles, but they may be overshadowed in the FRT by the high-$\theta$ reflectivity around the peak, leading to a spurious maximum in the FRT. To simplify the analysis, a binarized DRP that assumes value zero unless the intensity at a point is a local maximum along the $\varphi$ direction may be considered. This operation may yield a DRP with ones primarily along the centers of reflectance bands. According to various embodiments, the binarized DRP may be smoothen by Gaussian blurring to limit measurement noise and apply the FRT operation. This FRT may specifically highlight the bands that intersect at the obscured reflectance peak with much greater contrast and it may always contain at least two maximal great circles from which the angular location of the (111) vector may be estimated accurately.

According to various embodiments, any of these methods may yield a pair of rotation angles ($y_1$, $y_2$) specifying a great circle in the FRT, and the vector direction of [111] which lies along the same great circle. The great circle may also intersect [11$\bar{1}$], so the normal vector to the plane containing the great circle may be the cross product of these two vectors, [1$\bar{1}$0]. The components of this vector may be calculated from the great circle angles. Rotating [111] by 70.5° about [1$\bar{1}$0]_may give [11$\bar{1}$]. The sum of [111] and [11$\bar{1}$] may lie along the [001] crystal axis. According to various embodiments, similar vector manipulations may give the orientations of the basis vectors for the crystal coordinate system [100], [010], and [010], which may then be converted into the standard Euler angle triplet for that grain by known methods.

In comparison to EBSD orientation mapping, the FRT-based methodology may not require material-specific parameters, such as the lattice constant, to index DRPs. Instead, it may depend exclusively on reflection from surface facets with known crystallography. Based on experimental results, the same mathematical framework may be applicable to Nickel (Ni) sample and may also be effective on a Silicon (Si) sample etched to induce {111}-faceted pits. Compared to Ni sample, Si sample's DRPs may exhibit sharper {111} specular reflections connected by brighter reflectance bands.

The following pertains to various embodiments.

According to various embodiments, there is provided a method of determining 3D crystallographic orientation on a crystalline surface of a sample. The method may include directing a beam of collimated light to strike a spot on the crystalline surface at a predetermined angle of incidence, wherein reflections from the crystalline surface at said spot are projected onto an image sensing unit positioned in a path of reflected light. The image sensing unit may generate an image of a reflectance pattern based on angle-dependent-reflectance of the crystalline surface sensed by the image sensing unit. The method may include obtaining a directional reflectance profile from the image of the reflectance pattern by pixelising the reflectance pattern into a pixelated-image. The pixelated-image may have a center coinciding with an intersection of a specularly reflected light beam and the image sensing unit. The pixelated-image may be divided into equal radial-pixels-segments about the center and each radial-pixels-segment may be divided into pixels in respective radial direction. The method may further include processing the directional reflectance profile based on analysing reflection intensity data in the pixelated-image of the directional reflectance profile to determine the crystallographic orientation of the crystalline surface at said spot of the crystalline surface.

According to various embodiments, the method as described in the paragraph immediately above may optionally include that obtaining the directional reflection profile from the image of the reflectance pattern may include extracting an annular portion of the reflectance pattern and pixelising the annular portion of the reflectance pattern into the pixelated image with the center coinciding with the intersection of the specularly reflected light beam and the image sensing unit, wherein the pixelated image is a pixelated-annular-image and the center is an annulus-center of the pixelated-annular-image.

According to various embodiments, the method as described in any one of the two preceding paragraphs above may optionally include that the predetermined angle of incidence may be from 0° to 80° as measured from a surface normal of the crystalline surface.

According to various embodiments, the method as described in any one of the three preceding paragraphs above may optionally include that processing the directional reflectance profile may include transforming local-reflection-intensity-data of the pixels of the pixelated-annular-image of the directional reflectance profile to integrated-reflection-intensity-data along great circles of the directional reflectance profile, each great circle parameterized by an azimuth angle of the great circle and an elevation angle of a respective plane containing the great circle.

According to various embodiments, the method as described in the paragraph immediately above may optionally include that transforming may include applying a Funk-Radon transform to the local-reflection-intensity-data of the directional reflectance profile.

According to various embodiments, the method as described in the paragraph immediately above may optionally include that processing the directional reflectance profile may include determining the great circle with a highest value of the integrated-reflection-intensity-data and using the azimuth angle and the elevation angle of the great circle to determine the crystallographic orientation at said spot of the crystalline surface.

According to various embodiments, there is provided an apparatus configured to perform a method of determining 3D crystallographic orientation on a crystalline surface of a sample. The apparatus may include a collimated light source configured to be disposed above the crystalline surface and to direct a beam of collimated light at a predetermined angle of incidence to strike a spot on the crystalline surface. The apparatus may include an image sensing unit disposed in a path of reflected light and configured to generate an image of a reflectance pattern based on angle-dependent-reflectance of the crystalline surface sensed by the image sensing unit. The apparatus may include a processor in communication with the image sensing unit to receive the image of the reflectance pattern. The processor may be configured to obtain a directional reflectance profile from the image of the reflectance pattern. The processor may be configured to pixelise the reflectance pattern into a pixelated-image. The pixelated-image may have a center coinciding with an intersection of a specularly reflected light beam and the image sensing unit. The pixelated-image may be divided into equal radial-pixels-segments about the center and each radial-pixels-segment may be divided into pixels equally in respective radial direction. The processor may be configured to process the directional reflectance profile based on analysing reflection intensity data in the pixelated-image of the directional reflectance profile to determine the crystallographic orientation of the crystalline surface at the spot which the beam of collimated light is directed.

According to various embodiments, the apparatus as described in the paragraph immediately above may optionally include that the processor may be configured to obtain the directional reflectance profile from the image of the reflectance pattern by extracting an annular portion of the reflectance pattern and pixelising the annular portion of the reflectance pattern into the pixelated image with the center coninciding with the intersection of the specularly reflected light beam and the image sensing unit, wherein the pixelated image is a pixelated-annular-image and the center is an annulus-center of the pixelated-annular-image.

According to various embodiments, the apparatus as described in any one of the preceding two paragraphs above may optionally include that the processor may be configured to transform local-reflection-intensity-data of the pixels of the pixelated-annular-image of the directional reflectance profile to integrated-reflection-intensity-data along great circles of the directional reflectance profile, each great circle parameterized by an azimuth angle of the great circle and an elevation angle of a respective plane containing the great circle.

According to various embodiments, the apparatus as described in the paragraph immediately above may optionally include that the processor may be configured to apply a Funk-Radon transform to transform the local-reflection-intensity-data of the directional reflectance profile.

According to various embodiments, the apparatus as described in the paragraph immediately above may optionally include that the processor may be configured to determine the great circle with a highest value of the integrated-reflection-intensity-data and use the azimuth angle and the elevation angle of the great circle to determine the crystallographic orientation of the crystalline surface.

According to various embodiments, the apparatus as described in any one of the five preceding paragraphs above may optionally include a movable stage on which the sample with the crystalline surface may be placed.

According to various embodiments, the apparatus as described in the paragraph immediately above may optionally include that the movable stage is actuated, wherein the processor may be in communication with the movable stage so as to control an actuation of the movable stage to position the sample relative to the collimated light source such that the beam of collimated light may strike on the spot of the crystalline surface of the sample.

According to various embodiments, the apparatus as described in any one of the seven preceding paragraphs above may optionally include a pair of movable arms, a first of the movable arms coupled to the collimated light source and a second of the movable arms coupled to the image sensing unit.

According to various embodiments, the apparatus as described in the paragraph immediately above may optionally include that the pair of movable arms is actuated, wherein the processor may be in communication with the pair of movable arms so as to control an actuation of the pair of movable arms to position the collimated light source and the image sensing unit such that the beam of collimated light may strike on the spot of the crystalline surface of the sample and the image sensing unit may be positioned to sense the reflectance pattern of the reflections from the spot of the crystalline surface which the beam of collimated light is directed.

According to various embodiments, there is provided a method of determining 3D crystallographic orientation on a crystalline surface of a sample. The method may include directing a beam of collimated light to strike a spot on the crystalline surface at a predetermined angle of incidence, wherein reflections from the crystalline surface at said spot are projected onto a detector screen positioned in a path of reflected light, thereby displaying a reflectance pattern on the detector screen. The method may further include capturing an image of the reflectance pattern on the detector screen. The method may further include obtaining a directional reflectance profile from the captured image of the reflectance pattern by pixelising the reflectance pattern into a pixelated-image. The pixelated-image may have a center coinciding with an intersection of a specularly reflected light beam and the detector screen. The pixelated-image may be divided into equal radial-pixels-segments about the center and each radial-pixels-segment may be divided into pixels in respective radial direction. The method may further include processing the directional reflectance profile based on analysing reflection intensity data in the pixelated-image of the directional reflectance profile to determine the crystallographic orientation of the crystalline surface at said spot of the crystalline surface.

According to various embodiments, the method as described in the paragraph immediately above may optionally include that obtaining the directional reflectance profile from the captured image of the reflectance pattern may include extracting an annular portion of the reflectance pattern and pixelising the annular portion of the reflectance pattern into the pixelated-image with the center coinciding with the intersection of the specularly reflected light beam and the detector screen, wherein the pixelated image is a pixelated-annular-image and the center is an annulus-center of the pixelated-annular-image.

According to various embodiments, the method as described in any one of the preceding two paragraphs above may optionally include that the predetermined angle of incidence is from 0° to 80° as measured from a surface normal of the crystalline surface.

According to various embodiments, the method as described in any one of the preceding three paragraphs above may optionally include that the detector screen may include a light diffusing white screen.

According to various embodiments, the method as described in any one of the preceding four paragraphs above may optionally include that processing the directional reflectance profile may include transforming local-reflection-intensity-data of the pixels of the pixelated-image of the directional reflectance profile to integrated-reflection-intensity-data along great circles of the directional reflectance profile, each great circle parameterized by an azimuth angle of the great circle and an elevation angle of a respective plane containing the great circle.

According to various embodiments, the method as described in the paragraph immediately above may optionally include that transforming may include applying a Funk-Radon transform to the local-reflection-intensity-data of the directional reflectance profile.

According to various embodiments, the method as described in the paragraph immediately above may optionally include that processing the directional reflectance profile may include determining the great circle with a highest value of the integrated-reflection-intensity-data and using the azimuth angle and the elevation angle of the great circle to determine the crystallographic orientation at said pot of the crystalline surface.

According to various embodiments, there is provided an apparatus configured to perform a method of determining 3D crystallographic orientation on a crystalline surface of a sample. The apparatus may include a collimated light source configured to be disposed above the crystalline surface and to direct the beam of collimated light at a predetermined angle of incidence to strike a spot on the crystalline surface. The apparatus may include a detector screen configured disposed in a path of reflected light so as to obtain a reflectance pattern on the detector screen. The apparatus may include an image capturing device disposed relative to the detector screen in a manner so as to capture an image of the reflectance pattern on the detector screen. The apparatus may include a processor in communication with the image capturing device to receive the image of the reflectance pattern captured by the image capturing device. The processor may be configured to obtain a directional reflectance profile from the image of the reflectance pattern captured by the image capturing device. The processor may be configured to pixelise the reflectance pattern into a pixelated-image with a center coinciding with an intersection of a specularly reflected light beam and the detector screen. The pixelated-image may be divided into the equal radial-pixels-segments about the center and each radial-pixels-segment may be divided into pixels in respective radial direction. The processor may be configured to process the directional reflectance profile based on analysing reflection intensity data in the pixelated-image of the directional reflectance profile to determine the crystallographic orientation of the crystalline surface at the spot onto which the beam of collimated light is directed.

According to various embodiments, the apparatus as described in the paragraph immediately above may optionally include that the processor may be configured to obtain the directional reflectance profile from the image of the reflectance pattern by extracting an annular portion of the reflectance pattern and pixelising the annular portion of the reflectance pattern into the pixelated-image with the center coinciding with the intersection of the specularly reflected light beam and the detector screen, wherein the pixelated image is a pixelated-annular-image and the center is an annulus-center of the pixelated-annular-image.

According to various embodiments, the apparatus as described in any one of the preceding two paragraphs above may optionally include that the processor may be configured to transform local-reflection-intensity-data of the pixels of the pixelated-annular-image of the directional reflectance profile to integrated-reflection-intensity-data along great circles of the directional reflectance profile, each great circle parameterized by an azimuth angle of the great circle and an elevation angle of a respective plane containing the great circle.

According to various embodiments, the apparatus as described in the paragraph immediately above may optionally include that the processor may be configured to apply a Funk-Radon transform to transform the local-reflection-intensity-data of the directional reflectance profile.

According to various embodiments, the apparatus as described in the paragraph immediately above may optionally include that the processor may be configured to determine the great circle with a highest value of the integrated-reflection-intensity-data and use the azimuth angle and the elevation angle of the great circle to determine the crystallographic orientation of the crystalline surface.

According to various embodiments, the apparatus as described in any one of the preceding five paragraphs above may optionally include a movable stage on which the sample with the crystalline surface may be placed.

According to various embodiments, the apparatus as described in the paragraph immediately above may optionally include that the movable stage is actuated, wherein the processor may be in communication with the movable stage so as to control an actuation of the movable stage to position the sample relative to the collimated light source such that the beam of collimated light strikes on the spot of the crystalline surface of the sample.

According to various embodiments, the apparatus as described in any one of the preceding seven paragraphs may optionally include a pair of movable arms, a first of the movable arms coupled to the collimated light source and a second of the movable arms coupled to the detector screen.

According to various embodiments, the apparatus as described in the paragraph immediately above may optionally include that the pair of movable arms is actuated, wherein the processor may be in communication with the pair of movable arms so as to control an actuation of the pair of movable arms to position the collimated light source and the detector screen such that the beam of collimated light may strike on a desired spot of the crystalline surface of the sample and the detector screen may be positioned to display the reflectance pattern obtained by the reflections from the spot of the crystalline surface which the beam of collimated light is directed.

Various embodiments have provided a simple and effective solution for determining 3D crystallographic orientation. The methods and apparatus of the various embodiment may be based on optical microscopy. Various embodiments may also provide high-throughput orientation measurements, which may be applicable for commercial scale screening.

While the invention has been particularly shown and described with reference to specific embodiments, it should be understood by those skilled in the art that various changes, modification, variation in form and detail may be made therein without departing from the scope of the invention as defined by the appended statements. The scope of the invention is thus indicated by the appended statements and all changes which come within the meaning and range of equivalency of the statements are therefore intended to be embraced.

The invention claimed is:

1. A method of determining 3D crystallographic orientation of a grain on a crystalline surface of a sample, the method comprising:
   directing a beam of collimated light to strike a spot on the crystalline surface at a predetermined angle of incidence, wherein reflections from the crystalline surface at said spot are projected onto an image sensor positioned in a path of reflected light, thereby generating an image of a reflectance pattern based on angle-dependent-reflectance of the crystalline surface sensed by the image sensor;
   obtaining a directional reflectance profile from the image of the reflectance pattern by pixelising the reflectance pattern, according to a polar coordinate system, into a pixelated-image with a center coinciding with an intersection of a specularly reflected light beam and the image sensor, wherein the pixelated-image is divided into equal radial-pixels-segments about the center and each radial-pixels-segment is divided into pixels in respective radial direction to form a row of pixels extending along the respective radial direction; and
   processing the directional reflectance profile based on analyzing reflection intensity data in the pixels of the pixelated-image of the directional reflectance profile to determine the 3D crystallographic orientation of the grain on the crystalline surface at said spot of the crystalline surface.

2. The method according to claim 1, wherein obtaining the directional reflectance profile from the image of the reflectance pattern comprises extracting an annular portion of the reflectance pattern and pixelising the annular portion of the reflectance pattern into the pixelated image with the center coinciding with the intersection of the specularly reflected light beam and the image sensor, wherein the pixelated image is a pixelated-annular-image and the center is an annulus-center of the pixelated-annular-image.

3. The method according to claim 1, wherein the predetermined angle of incidence is from 0° to 80° as measured from a surface normal of the crystalline surface.

4. The method according to claim 1, wherein processing the directional reflectance profile comprises transforming local-reflection-intensity-data of the pixels of the pixelated-image of the directional reflectance profile to integrated-reflection-intensity-data along great circles of the directional reflectance profile, each great circle parameterized by an azimuth angle of the great circle and an elevation angle of a respective plane containing the great circle.

5. The method according to claim 4, wherein transforming comprises applying a Funk-Radon transform to the local-reflection-intensity-data of the directional reflectance profile.

6. The method according to claim 5, wherein processing the directional reflectance profile comprises determining the great circle with a highest value of the integrated-reflection-intensity-data and using the azimuth angle and the elevation angle of the great circle to determine the 3D crystallographic orientation of the grain at said spot of the crystalline surface.

7. A method of determining 3D crystallographic orientation of a grain on a crystalline surface of a sample, the method comprising:
   directing a beam of collimated light to strike a spot on the crystalline surface at a predetermined angle of incidence, wherein reflections from the crystalline surface at said spot are projected onto a detector screen positioned in a path of reflected light, thereby displaying a reflectance pattern on the detector screen;
   capturing an image of the reflectance pattern on the detector screen;
   obtaining a directional reflectance profile from the captured image of the reflectance pattern by pixelising the reflectance pattern, according to a polar coordinate system, into a pixelated-image with a center coinciding with an intersection of a specularly reflected light beam and the detector screen, wherein the pixelated-image is radially divided into equal radial-pixels-segments about the center and each radial-pixels-segment is divided into pixels in respective radial direction to form a row of pixels extending along the respective radial direction; and
   processing the directional reflectance profile based on analyzing reflection intensity data in the pixels of the pixelated-image of the directional reflectance profile to determine the 3D crystallographic orientation of the grain on the crystalline surface at said spot of the crystalline surface.

8. The method according to claim 7, wherein obtaining the directional reflectance profile from the captured image of the reflectance pattern comprises extracting an annular portion of the reflectance pattern and pixelising the annular portion of the reflectance pattern into the pixelated-image with the center coinciding with the intersection of the specularly reflected light beam and the detector screen, wherein the pixelated image is a pixelated-annular-image and the center is an annulus-center of the pixelated-annular-image.

9. The method according to claim 7, wherein the predetermined angle of incidence is from 0° to 80° as measured from a surface normal of the crystalline surface.

10. The method according to claim 7, wherein the detector screen is a light diffusing white screen.

11. The method according to claim 7, wherein processing the directional reflectance profile comprises transforming local-reflection-intensity-data of the pixels of the pixelated-image of the directional reflectance profile to integrated-reflection-intensity-data along great circles of the directional reflectance profile, each great circle parameterized by an azimuth angle of the great circle and an elevation angle of a respective plane containing the great circle.

12. The method according to claim 11, wherein transforming comprises applying a Funk-Radon transform to the local-reflection-intensity-data of the directional reflectance profile.

13. The method according to claim 11, wherein processing the directional reflectance profile comprises determining the great circle with a highest value of the integrated-reflection-intensity-data and using the azimuth angle and the elevation angle of the great circle to determine the 3D crystallographic orientation of the grain at said spot of the crystalline surface.

14. An apparatus configured to perform a method of determining 3D crystallographic orientation of the grain on a crystalline surface of a sample, the apparatus comprising:
- a collimated light source configured to be disposed above the crystalline surface and to direct a beam of collimated light at a predetermined angle of incidence to strike a spot on the crystalline surface;
- a detector screen disposed in a path of reflected light so as to display a reflectance pattern on the detector screen;
- a camera disposed relative to the detector screen in a manner so as to capture an image of the reflectance pattern on the detector screen; and
- a processor in communication with the camera to receive the image of the reflectance pattern captured by the camera,
- wherein the processor is configured to obtain a directional reflectance profile from the image of the reflectance pattern by extracting an annular portion of the reflectance pattern and pixelising the annular portion of the reflectance pattern, according to a polar coordinate system, into a pixelated-image with a center coinciding with an intersection of a specularly reflected light beam and the detector screen, wherein the pixelated-image is divided into equal radial-pixels-segments about the center and each radial-pixels-segment is divided into pixels in respective radial direction to form a row of pixels extending along the respective radial direction, and
- wherein the processor is configured to process the directional reflectance profile based on analyzing reflection intensity data in the pixels of the pixelated-image of the directional reflectance profile to determine the 3D crystallographic orientation of the grain on the crystalline surface at the spot which the beam of collimated light is directed.

15. The apparatus according to claim 14, wherein the processor is configured to obtain the directional reflectance profile from the image of the reflectance pattern by extracting an annular portion of the reflectance pattern and pixelising the annular portion of the reflectance pattern into the pixelated-image with the center coinciding with the intersection of the specularly reflected light beam and the detector screen, wherein the pixelated image is a pixelated-annular-image and the center is an annulus-center of the pixelated-annular-image.

16. The apparatus according to claim 14, wherein the processor is configured to transform local-reflection-intensity-data of the pixels of the pixelated-image of the directional reflectance profile to integrated-reflection-intensity-data along great circles of the directional reflectance profile, each great circle parameterized by an azimuth angle of the great circle and an elevation angle of a respective plane containing the great circle.

17. The apparatus according to claim 16, wherein the processor is configured to apply a Funk-Radon transform to transform the local-reflection-intensity-data of the directional reflectance profile.

18. The apparatus according to claim 16, wherein the processor is configured to determine the great circle with a highest value of the integrated-reflection-intensity-data and use the azimuth angle and the elevation angle of the great circle to determine the 3D crystallographic orientation of the grain on the crystalline surface.

19. The apparatus according to claim 14, further comprising a movable stage on which the sample with the crystalline surface is placed, wherein the movable stage is actuated, and wherein the processor is in communication with the movable stage so as to control an actuation of the movable stage to position the sample relative to the collimated light source such that the beam of collimated light strikes on the spot of the crystalline surface of the sample.

20. The apparatus according to claim 14, further comprising a pair of movable arms, a first of the movable arms coupled to the collimated light source and a second of the movable arms coupled to the detector screen, wherein the pair of movable arms is actuated, and wherein the processor is in communication with the pair of movable arms so as to control an actuation of the pair of movable arms to position the collimated light source and the detector screen such that the beam of collimated light strikes on a desired spot of the crystalline surface of the sample and the detector screen is positioned to display the reflectance pattern obtained by the reflections from the spot of the crystalline surface which the beam of collimated light is directed.

* * * * *